United States Patent
Wang et al.

(10) Patent No.: US 10,062,151 B2
(45) Date of Patent: Aug. 28, 2018

(54) IMAGE DEBLURRING METHOD AND APPARATUS

(71) Applicant: SAMSUNG ELECTRONICS CO., LTD., Suwon-si (KR)

(72) Inventors: Qiang Wang, Beijing (CN); Kyoobin Lee, Seoul (KR); Keun Joo Park, Seoul (KR); Ping Guo, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/356,808

(22) Filed: Nov. 21, 2016

(65) Prior Publication Data

US 2017/0213324 A1    Jul. 27, 2017

(30) Foreign Application Priority Data

Jan. 21, 2016  (CN) .......................... 2016 1 0039224
Aug. 24, 2016  (KR) ........................ 10-2016-0107863

(51) Int. Cl.
G06K 9/40   (2006.01)
G06T 5/00   (2006.01)
G06T 5/50   (2006.01)
G06T 7/00   (2017.01)
G06T 7/20   (2017.01)

(52) U.S. Cl.
CPC ............... *G06T 5/003* (2013.01); *G06T 5/50* (2013.01); *G06T 7/003* (2013.01); *G06T 7/0038* (2013.01); *G06T 7/0085* (2013.01); *G06T 7/0093* (2013.01); *G06T 7/204* (2013.01); *G06T 2207/20221* (2013.01); *G06T 2207/30241* (2013.01)

(58) Field of Classification Search
CPC ..................... G06T 7/13; G06T 7/0016; G06T 2207/10088; G06T 2207/30016; G06T 2207/30096; G06T 5/003; G06T 2207/30241; G06T 2207/20192; G06T 2207/20201; A61B 34/20; A61B 34/30; A61B 90/361; A61B 2034/2051; G06F 19/3481; G06F 19/321
See application file for complete search history.

(56) References Cited

U.S. PATENT DOCUMENTS

| 8,184,182 B2 | 5/2012 | Lee et al. |
| 8,189,947 B2 | 5/2012 | Lee |
| 9,142,009 B2 | 9/2015 | Lin |
| 2007/0098253 A1* | 5/2007 | Crespi ............... G06K 9/00778 382/159 |
| 2013/0271615 A1 | 10/2013 | Webster et al. |
| 2014/0010475 A1 | 1/2014 | Crandall et al. |
| 2014/0125994 A1* | 5/2014 | Kim ...................... G01B 11/22 356/601 |

(Continued)

FOREIGN PATENT DOCUMENTS

| KR | 100926133 B1 | 11/2009 |
| KR | 101248225 B1 | 3/2013 |

*Primary Examiner* — Ali Bayat
(74) *Attorney, Agent, or Firm* — Sughrue Mion, PLLC

(57) ABSTRACT

An image deblurring method and an image deblurring apparatus are provided. The image deblurring method includes acquiring a blurred image and a dynamic vision sensor (DVS) event set that is recorded by a DVS while the blurred image is exposed, and deblurring the blurred image, based on the DVS event set.

18 Claims, 12 Drawing Sheets

(56) References Cited

U.S. PATENT DOCUMENTS

| | | | |
|---|---|---|---|
| 2015/0002545 A1 | 1/2015 | Webster et al. | |
| 2015/0110404 A1* | 4/2015 | Cho | G06T 5/003 |
| | | | 382/195 |
| 2015/0254822 A1 | 9/2015 | Levy | |
| 2016/0078321 A1* | 3/2016 | Wang | G06K 9/6267 |
| | | | 382/103 |
| 2016/0080670 A1* | 3/2016 | Rangan | G06K 9/00771 |
| | | | 348/302 |
| 2016/0094768 A1* | 3/2016 | Ovsiannikov | H04N 5/378 |
| | | | 348/372 |
| 2017/0374322 A1* | 12/2017 | Gousev | G06K 9/605 |

\* cited by examiner

FIG. 2
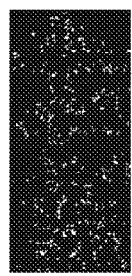
+
⋮
+
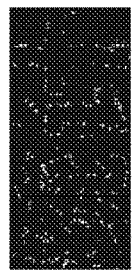
+
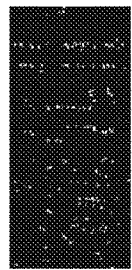
=

IMAGE DEBLURRING METHOD AND APPARATUS

CROSS-REFERENCE TO RELATED APPLICATIONS

This application claims priority from Chinese Patent Application No. 201610039224.2, filed on Jan. 21, 2016 in the State Intellectual Property Office of the People's Republic of China, and Korean Patent Application No. 10-2016-0107863, filed on Aug. 24, 2016 in the Korean Intellectual Property Office, the disclosures of which are incorporated herein by reference in their entireties.

BACKGROUND

1. Field

Methods and apparatuses consistent with example embodiments relate to image processing technology. More particularly, example embodiments relate to an image deblurring method and apparatus.

2. Description of the Related Art

When capturing a photo using a camera, an image may be blurred due to various causes such as camera shake. In general, to remove or reduce image blurring related to a camera motion, the blurred image may be deblurred to acquire a sharp image.

An existing deblurring method removes blurring using deconvolution, and thus is used to deblur a predetermined image. The deblurring method using deconvolution may not be effective in a case in which a cause of image blurring is unknown. Because the cause of image blurring is unknown, many deblurring methods set a target value for an image to be processed. However, when an actual image does not satisfy the set value, the deblurring methods may not be effective.

SUMMARY

Example embodiments may address at least the above problems and/or disadvantages and other disadvantages not described above. Also, the example embodiments are not required to overcome the disadvantages described above, and an example embodiment may not overcome any of the problems described above.

According to an aspect of an example embodiment, there is provided an image deblurring method including acquiring a blurred image and a dynamic vision sensor (DVS) event set that is recorded by a DVS while the blurred image is exposed, and deblurring the blurred image, based on the DVS event set.

The deblurring may include estimating a DVS edge estimation image, based on the DVS event set, and deblurring the blurred image, based on the DVS edge estimation image.

The estimating may include dividing an exposure time into N time slices in a temporal order, generating an image by integrating DVS events positioned in a same time slice, among the DVS event set, aligning and overlaying images that are generated in the N time slices, and determining a skeleton diagram of the overlaid images as the DVS edge estimation image.

The aligning may include determining $$[\Delta x, \Delta y] = \operatorname{argmin} \sum_{x,y} (B(x + \Delta x, y + \Delta y) - A(x, y))^2$$

with respect to images A and B of arbitrary two time slices, (x,y) denoting two-dimensional (2D) coordinates of a pixel point of an image, A(x,y) and B(x,y) denoting a value of a pixel point of the image A and a value of a pixel point of the image B, respectively, $\Delta x$ and $\Delta y$ denoting 2D displacement values that are used to align the image B to the image A, and arg min (·) denoting an independent variable when (·) is at a minimum, determining a displacement of either one or both of the image B and the image A, based on the [$\Delta x, \Delta y$], and aligning the image A and the image B, based on the displacement.

The aligning and overlaying may include any one or any combination of determining [$\Delta x, \Delta y$] with respect to images that are generated for every two consecutive time slices, and aligning and overlaying an image of a subsequent time slice to an image of a previous time slice, and determining [$\Delta x, \Delta y$] with respect to images that are generated for every two consecutive time slices, and aligning and overlaying an image of a previous time slice to an image of a subsequent time slice.

The deblurring of the blurred image, based on the DVS edge estimating image, may include aligning the blurred image and the DVS edge estimation image, and deblurring the blurred image, based on an alignment result of the alignment.

The deblurring of the blurred image, based on the alignment result, may include deblurring the aligned blurred image, based on the aligned DVS edge estimation image, using deconvolution transform, outputting an image of a current iteration as a deblurring result of the deblurring of the aligned blurred image, determining that the deblurring result is equal to a deblurring value in response to a difference in sharpness between an image of the current iteration and an image of a previous iteration being less than a threshold, and determining that the deblurring result is less than the deblurring value in response to the difference in sharpness being greater than the threshold.

The method may further include determining a blurring kernel, based on $\hat{k} = \arg \min \|\partial \hat{I} * - \partial \hat{C}\|_2 + \lambda_1 \|\hat{k}\|_1 + \lambda_2 \|\partial \hat{I} - \hat{E}\|_2$, $\hat{x}$ denoting a vector form of a matrix x, $\partial$ denoting an operation of a gradient, I denoting an image acquired after deblurring, C denoting an aligned blurred image, E denoting an aligned DVS edge estimation image, $\|vec\|_2$ denoting a 2-norm of a vector, $\|vec\|_1$ denoting a 1-norm of a vector, $\lambda_1$ and $\lambda_2$ denoting two weight values, and arg min (·) denoting an independent variable when (·) is at a minimum.

The deblurring of the blurred image, based on the DVS edge estimating image, may include aligning the blurred image and the DVS edge estimation image, deblurring the blurred image based on an alignment result of the alignment, determining an average edge diagram, based on a deblurring result of the deblurring of the blurred image, based on the alignment result, in response to the deblurring result being less than a deblurring value and a deblurring count of the deblurring of the blurred image, based on the alignment result, being less than a maximum iteration count, realigning the blurred image and the DVS edge estimation image, based on the average edge diagram, until the deblurring result is equal to the deblurring value or the deblurring count is equal to the maximum iteration count, and outputting the deblurring result.

The deblurring of the blurred image, based on the DVS edge estimating image, may include aligning the blurred image and the DVS edge estimation image, deblurring the blurred image, based on an alignment result of the alignment, determining an average edge diagram, based on a deblurring result of the deblurring of the blurred image, based on the alignment result, in response to a deblurring count of the deblurring of the blurred image, based on the alignment result, being less than a maximum iteration count, realigning the blurred image and the DVS edge estimation image, based on the average edge diagram, until the deblurring count is equal to the maximum iteration count, and outputting the deblurring result.

The deblurring of the blurred image, based on the DVS edge estimating image, may include aligning the blurred image and the DVS edge estimation image, deblurring the blurred image, based on an alignment result of the alignment, determining an average edge diagram, based on a deblurring result of the deblurring of the blurred image, based on the alignment result, until the deblurring result is less than a deblurring value and a deblurring count of the deblurring of the blurred image, based on the alignment result, is equal to a maximum iteration count, realigning the blurred image and the DVS edge estimation image, based on the average edge diagram, until the deblurring result is equal to the deblurring value or the deblurring count is equal to the maximum iteration count, and outputting the deblurring result.

The deblurring may include estimating a camera motion trajectory and a DVS edge estimation image, based on the DVS event set, and deblurring the blurred image, based on the camera motion trajectory and the DVS edge estimation image.

The deblurring of the blurred image, based on the camera motion trajectory and the DVS edge estimation image, may include aligning the blurred image and the DVS edge estimation image, deblurring the blurred image, based on an alignment result of the alignment, determining an average edge diagram on the camera motion trajectory, based on a deblurring result of the deblurring of the blurred image, based on the alignment result, in response to the deblurring result being less than a deblurring value, realigning the blurred image and the DVS edge estimation image until the deblurring result is equal to the deblurring value, and outputting the deblurring result.

The determining of the average edge diagram may include determining edge diagrams in all segment directions on the camera motion trajectory with respect to a sharpness of an image in a current iteration, overlaying the edge diagrams, and determining, based on the overlaid edge diagrams, a skeleton diagram to be the average edge diagram.

The deblurring of the blurred image, based on the camera motion trajectory and the DVS edge estimation image, may include aligning the blurred image and the DVS edge estimation image, deblurring the blurred image, based on an alignment result of the alignment, determining an average edge diagram on the camera motion trajectory, based on a deblurring count of the deblurring of the blurred image, based on the alignment result, in response to the deblurring count being less than a maximum iteration count, realigning the blurred image and the DVS edge estimation image, based on the average edge diagram, until the deblurring count is equal to the maximum iteration count, and outputting the deblurring result.

The deblurring of the blurred image, based on the camera motion trajectory and the DVS edge estimation image, may include aligning the blurred image and the DVS edge estimation image, deblurring the blurred image based on an alignment result of the alignment, determining an average edge diagram on the camera motion trajectory, based on a deblurring result of the deblurring of the blurred image, based on the alignment result, in response to the deblurring result being less than a deblurring value and a deblurring count of the deblurring of the blurred image, based on the alignment result, being less than a maximum iteration count, realigning the deblurring image and the DVS edge estimation image, based on the average edge diagram, until the deblurring result is equal to the deblurring value or the deblurring count is equal to the maximum iteration count, and outputting the deblurring result.

The estimating of the camera motion trajectory, based on the DVS event set, may include dividing an exposure time into N time slices in a temporal order, generating an independent image, based on DVS events positioned in a same time slice, among the DVS event set, and determining the camera motion trajectory during exposure, based on images that are generated in the N time slices.

The determining of the camera motion trajectory may include determining a camera displacement in two consecutive time slices, based on a positional relationship of the DVS events, in images that are generated for every two consecutive time slices, connecting camera displacements in a temporal order for every two consecutive time slices during the exposure, and generating a camera motion trajectory during the exposure.

According to an example embodiment, there is provided an image deblurring apparatus including an acquirer configured to acquire a blurred image and a dynamic vision sensor (DVS) event set that is recorded by a DVS while the blurred image is exposed, and an image deblurrer configured to deblur the blurred image, based on the DVS event set.

BRIEF DESCRIPTION OF THE DRAWINGS

The above and/or other aspects will be more apparent by describing example embodiments with reference to the accompanying drawings, in which:

FIG. 2 is a diagram illustrating forming an image of a dynamic vision sensor (DVS) event set and a relationship between images formed in respective time slices, according to an example embodiment;

DETAILED DESCRIPTION

Figure 1:
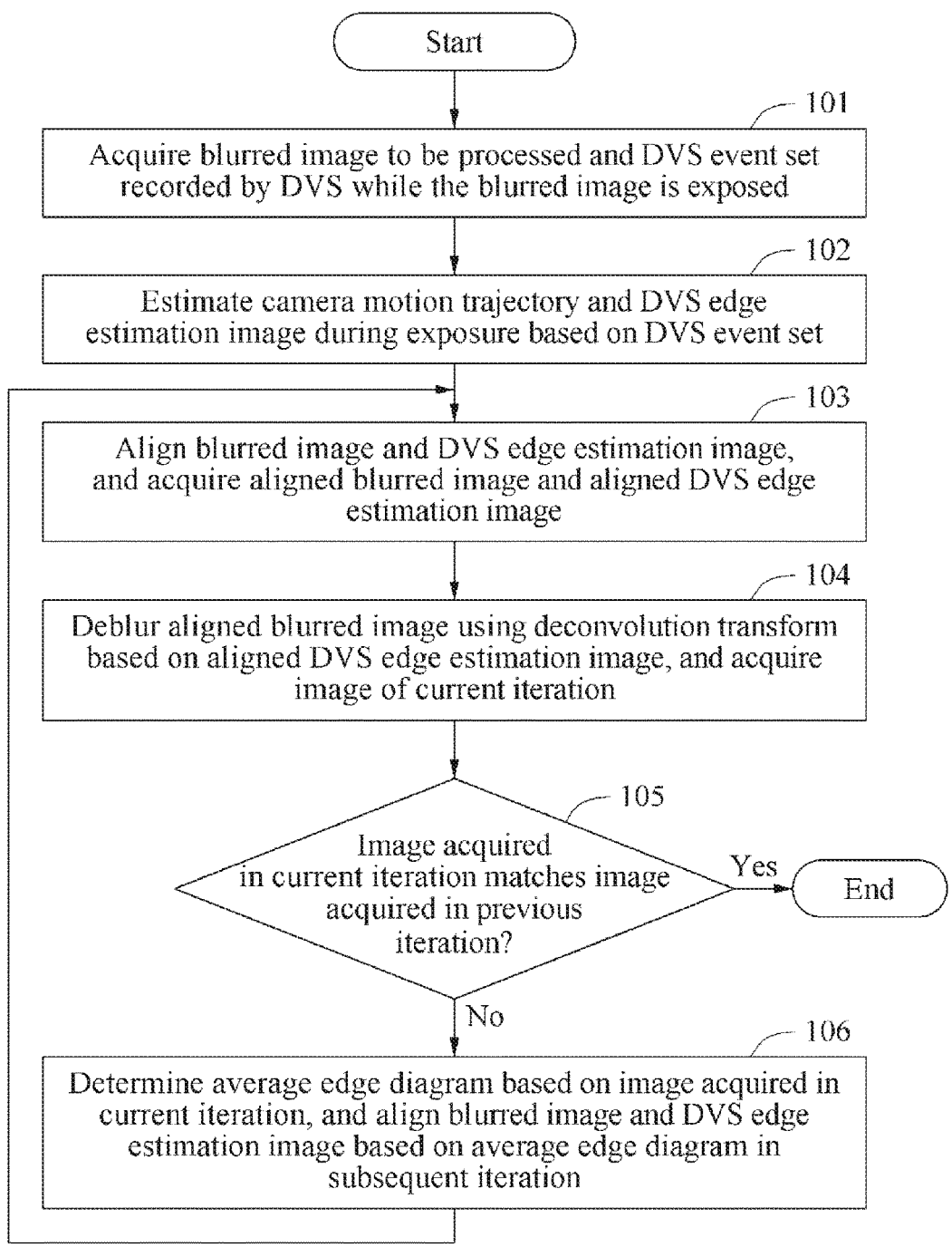
FIG. 1 is a flowchart illustrating an image deblurring method according to an example embodiment.

Example embodiments are described in greater detail herein with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions may not be described in detail because they would obscure the description with unnecessary detail.

In addition, the terms such as "unit," "-er (-or)," and "module" described in the specification refer to an element for performing at least one function or operation, and may be implemented in hardware, software, or the combination of hardware and software.

A dynamic vision sensor (DVS) may record DVS events output using a high speed camera with a microsecond time resolution, and represent all changes occurring in a camera lens for a unit time of a microsecond. A change in the lens may occur at an edge in an image. By fixing the DVS to a camera, a relatively sharp edge image may be acquired using the high speed camera. Herein, a blurred image captured using a camera may be deblurred based on the relatively sharp edge image acquired through the DVS, whereby a deblurring effect may improve.

A basic image deblurring method may be performed through operations as follows.

Operation 1: Acquire a blurred image to be processed and a DVS event set recorded by the DVS while the blurred image is exposed.

Operation 2: Deblur the blurred image based on the DVS event set.

In operation 2, a DVS edge estimation image may be estimated based on the DVS event set and the blurred image may be deblurred based on the DVS edge estimation image, or a camera motion trajectory and a DVS edge estimation image may be estimated based on the DVS event set and the blurred image may be deblurred based on the camera motion trajectory and the DVS edge estimation image.

FIG. 1 is a flowchart illustrating an image deblurring method according to an example embodiment. As shown in FIG. 1, the image deblurring method includes the following operations.

In operation 101, the image deblurring method acquires a blurred image to be processed and a DVS event set recorded by a DVS while the blurred image is exposed. A red, green and blue (RGB) blurred image captured using a camera may be acquired. By fixing the DVS to the camera, records at the same angle may be acquired. Further, the recorded DVS events may reflect motions of the camera. When a DVS event set of the blurred image is acquired during exposure, the DVS event set may reflect a camera motion trajectory during a corresponding exposure time.

In operation 102, the image deblurring method estimates a camera motion trajectory and a DVS edge estimation image during the exposure based on the DVS event set. An exposure time may be divided into N time slices in a temporal order. In this example, N may be a preset positive integer that may be changed. However, example embodiments are not limited thereto. The DVS event set during the exposure may include a plurality of DVS events. The DVS events may each indicate a time. In view of the time slices, DVS events positioned in the same time slice may form an independent image based on times indicated by the DVS events. The independent image may be formed using any arbitrary scheme.

FIG. 2 is a diagram forming an image of a DVS event set and a relationship between images formed in respective time slices, according to an example embodiment.

First, generation of a blurred image and a role of an image formed by a DVS event are analyzed. When assuming that an object captured using a camera is static during exposure, blurring in the image is caused by a motion of the camera relative to the static captured object. Thus, all images formed in respective time slices correspond to relatively sharp edge images in a situation in which the camera performs a relatively quick motion within a time range. Images in different time slices are acquired by capturing the same object, and thus edge images also have the same contour. However, a relative displacement may occur in backgrounds of the edge images. The displacement is a relative camera motion trajectory between different time slices. Further, images formed in different time slices are the same edge images acquired at different points in time. However, due to an effect of noise, an edge of each image may not be accurate or perfect. Thus, by restoring images in all N time slices to the same point in time based on the camera motion trajectory (i.e., a camera motion trajectory diagram), and overlaying the N images of the same point in time, a relatively sharp edge diagram may be acquired.

Images formed in two different time slices may have the same shape, and a change in a positional relationship of the shapes in the entire image may indicate a rectilinear motion relationship of the camera in the two time slices, i.e., a motion estimation between two images. By performing a reverse motion with respect to one of the images based on the motion relationship, an image in a time slice in which the other of the images is positioned may be acquired. By overlaying these two images, a more effective edge diagram may be acquired.

Based on the analysis result, the camera motion trajectory and the DVS edge estimation image during the exposure are determined based on the images formed in the N time slices.

In detail, the camera motion trajectory during the exposure is determined by determining a camera displacement in two consecutive time slices based on a positional relationship of the DVS events, connecting camera displacements for every two consecutive time slices during the exposure in a temporal order, and configuring the camera motion trajectory during the exposure.

Figure 3:
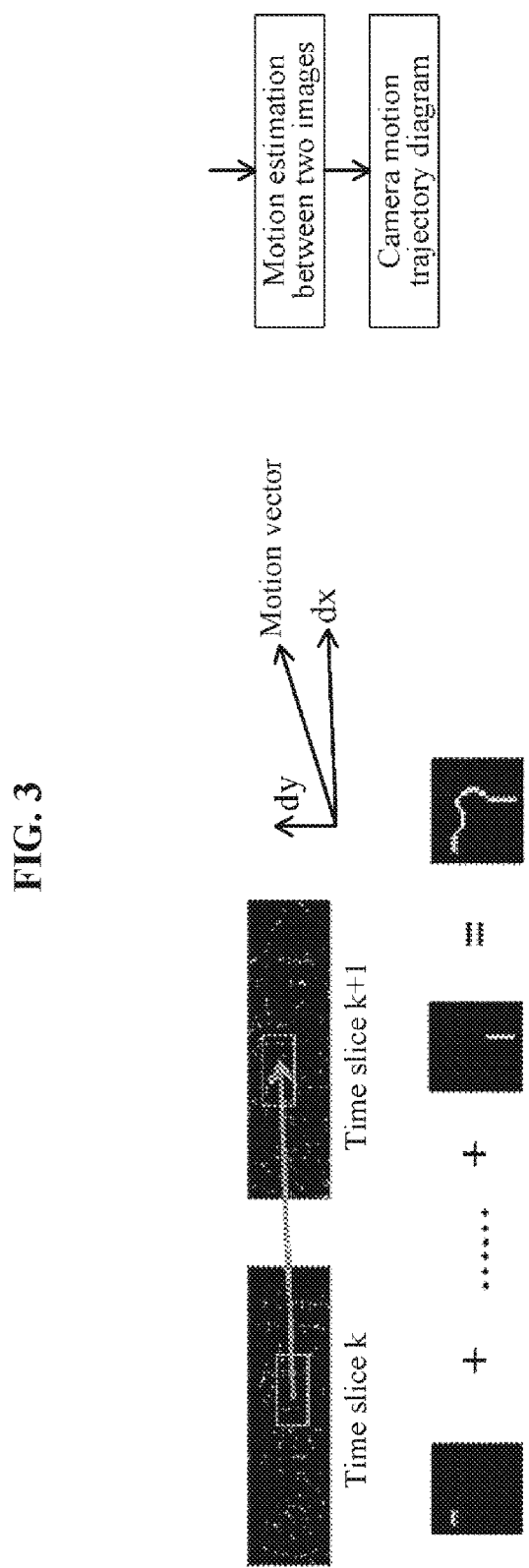
FIG. 3 is a diagram illustrating a camera displacement in two consecutive time slices, according to an example embodiment.

FIG. 3 is a diagram illustrating a camera displacement in two consecutive time slices, according to an example embodiment.

The camera displacement in two consecutive time slices is determined by calculating Equation 1 with respect to images A and B of arbitrary two consecutive time slices.

$$[\Delta x, \Delta y] = \operatorname{argmin} \sum_{x,y} (B(x + \Delta x, y + \Delta y) - A(x, y))^2 \quad \text{[Equation 1]}$$

In Equation 1, (x,y) denotes two-dimensional (2D) coordinates of a pixel point of an image. A(x,y) and B(x,y) denote a value of a pixel point of the image A and a value of a pixel point of the image B, respectively. $\Delta x$ and $\Delta y$ denote 2D camera displacements from a point in time of the image B to a point in time of the image A. A motion vector as shown in FIG. 2 may be acquired based on the 2D displacements. Here, it is assumed that the camera performs a rectilinear motion in the two consecutive time slices. By connecting motion vectors in every two consecutive time slices in a temporal order, the camera motion trajectory during the exposure may be acquired.

Figure 4:
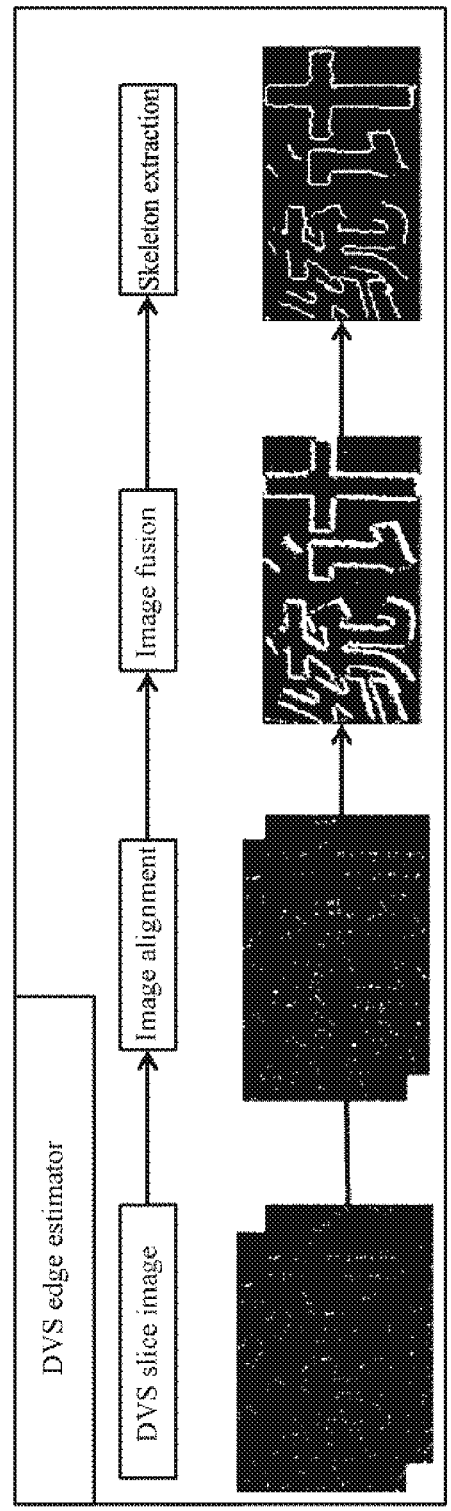
FIG. 4 is a diagram illustrating a process of performing DVS edge estimation, according to an example embodiment.

FIG. 4 is a diagram illustrating a process of performing DVS edge estimation, according to an example embodiment. As shown in FIG. 4, the DVS edge estimation image is determined by aligning and overlaying (i.e., fusing) the images formed in all the time slices, and calculating (i.e., extracting) a skeleton diagram of the overlaid images as the DVS edge estimation image.

The alignment is performed by aligning, integrating, and overlaying the images of all the time slices to the same time slice, or by aligning an image of a single time slice to another time slice, overlaying images of the two time slices, and aligning an overlaying result to another time slice. Here, 2D displacement values Δx and Δy between images of arbitrary two time slices are calculated using Equation 1, and the 2D displacement values may be used to align the image B and the image A. The displacement (Δx,Δy) of the image B may be aligned to the image A, the displacement (−Δx,−Δy) of the image A may be aligned to the image B, or displacement may be simultaneously performed with respect to the image A and the image B and aligned to different time slices between the image A and the image B.

When calculating a displacement using Equation 1, it is assumed that a movement between two time slices is a rectilinear motion. However, as an error between the rectilinear motion and an actual motion increases with an increase in an actual time interval, an accuracy of estimation decreases. Thus, in a case of aligning and overlaying images, Δx and Δy of images for every two consecutive time slices are calculated, and an image of a subsequent or previous time slice is aligned and overlaid to an image of a previous or subsequent time slice. Through the above method, the accuracy of estimation may improve.

Referring again to FIG. 1, after performing operation 102, image blurring is iteratively removed.

In operation 103, the image deblurring method aligns the acquired blurred image and the DVS edge estimation image, and acquires the aligned blurred image and the aligned DVS edge estimation image.

Figure 5:
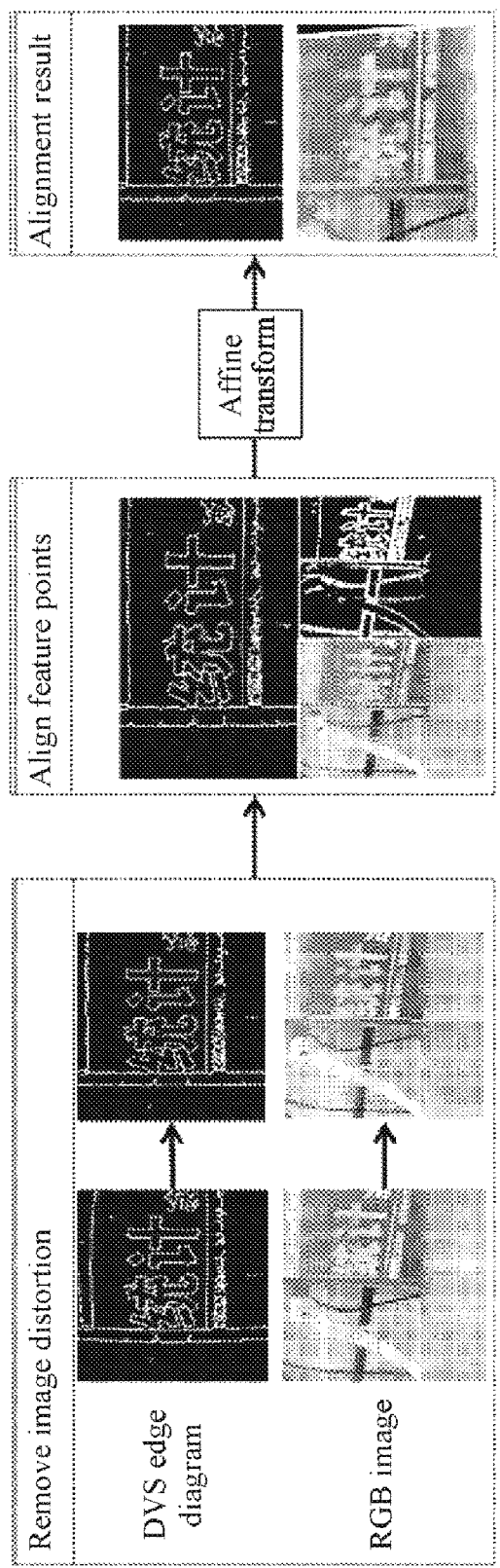
FIG. 5 is a diagram illustrating a process of aligning a red, green and blue (RGB) image and a DVS image, according to an example embodiment.

FIG. 5 is a diagram illustrating a process of aligning an RGB image and a DVS image, according to an example embodiment. As shown in FIG. 5, RGB-DVS image alignment processing removes a distortion in each of an RGB image and a DVS edge estimation image or diagram. Corresponding key points in the two images are acquired, and an Affine transform model is calculated to align feature points of the two images. The image alignment processing through distortion detection, key point determination and the model is an existing technology, and thus detailed descriptions thereof will be omitted for conciseness. When the distortion removing processing is incorporated in operation 103, the images may be aligned by directly determining the key points, rather than performing the distortion removing processing in view of a complexity. When performing the alignment, the RGB image may be aligned to the DVS edge estimation image, or the DVS edge estimation image may be aligned to the RGB image. When aligning the RGB image to the DVS edge estimation image, a more effect result may be obtained.

Further, when performing an initial iteration, the alignment is performed directly using the RGB blurred image and the DVS edge estimation image. When performing a subsequent iteration, the RGB blurred image and the DVS edge estimation image are aligned based on an RGB edge estimation image determined in the previous iteration, whereby a degree of precision of RGB and DVS registration may improve.

Referring again to FIG. 1, in operation 104, the image deblurring method deblurs the aligned blurred image using deconvolution transform based on the aligned DVS edge estimation image, and acquires an image of a current iteration.

Figure 6:
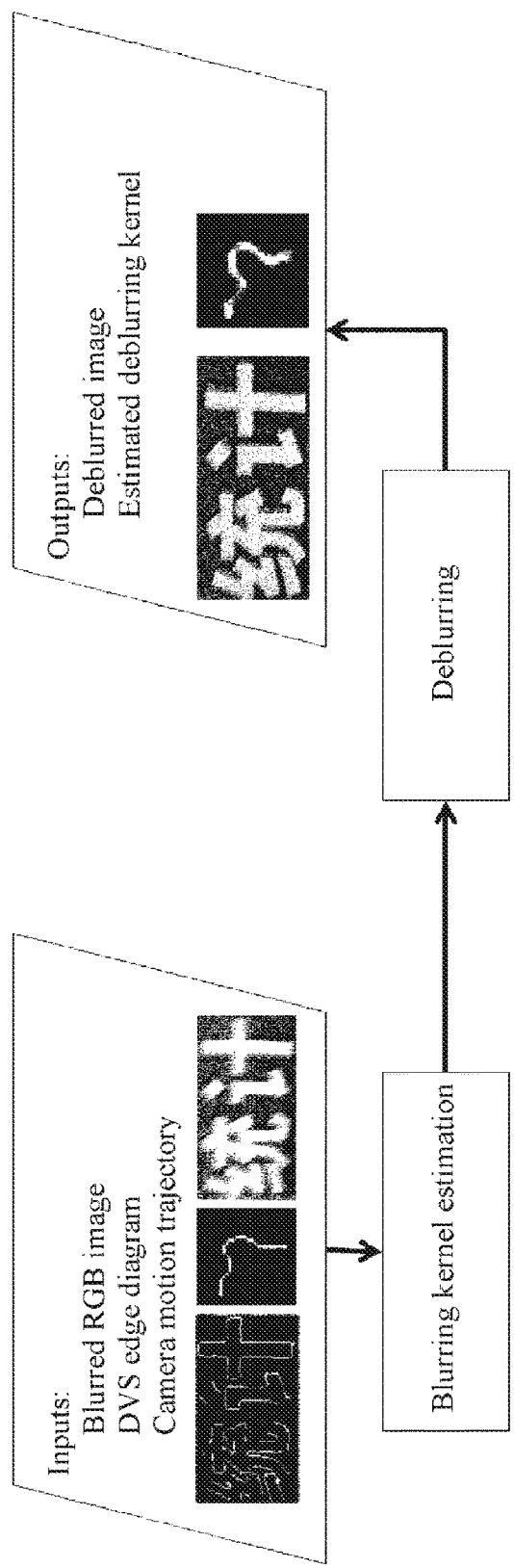
FIG. 6 is a diagram illustrating a process of calculating a sharp image, according to an example embodiment.

FIG. 6 is a diagram illustrating a process of calculating a sharp image, according to an example embodiment. Processing of an image deblurrer estimates a blurring kernel of an image and implements deblurring using deconvolution transform.

The blurring kernel k may be calculated using Equation 2.

$$\hat{k} = \arg\min \lVert \partial \hat{I} * \hat{k} - \partial \hat{C} \rVert_2 + \lambda_1 \lVert \hat{k} \rVert_1 + \lambda_2 \lVert \partial \hat{I} - \hat{E} \rVert_2 \qquad \text{[Equation 2]}$$

In Equation 2, $\hat{X}$ denotes a vector form of a matrix x. $\partial$ denotes an operation of gradient. $\hat{I}$ denotes an image acquired after deblurring. $\hat{C}$ denotes an aligned blurred image, and E denotes an aligned DVS edge estimation image. $\lVert vec \rVert_2$ denotes a 2-norm of a vector, and $\lVert vec \rVert_1$ denotes a 1-norm of a vector. $\lambda_1$ and $\lambda_2$ denote two preset weight values. arg min (·) denotes an independent variable when (·) is at a minimum.

When the blurring kernel k is acquired, a sharp RGB image $\hat{I}$ may be acquired using Equation 3.

$$\hat{I} = \arg\min \lVert \hat{I} * \hat{k} - \hat{B}' \rVert_2 + \frac{\lVert \hat{I} \rVert_1}{\lVert \hat{I} \rVert_2} \qquad \text{[Equation 3]}$$

In Equation 3, $\hat{X}$ denotes a vector form of a matrix x. $\lVert vec \rVert_2$ denotes a 2-norm of a vector, and $\lVert vec \rVert_1$ denotes a 1-norm of a vector. $\hat{B}'$ denotes an aligned blurred image.

When a count of performing the process of acquiring the blurring kernel and the sharp image reaches a preset maximum count, or the acquired image does not change any further, $\hat{I}$ acquired through the calculation is determined to be an image acquired in a corresponding iteration.

In operation 104, $\hat{I}$ is calculated using the existing technology. The blurring kernel $\hat{k}$ is calculated based on the aligned DVS edge estimation image $\hat{E}$. Thus, by using the image $\hat{E}$ to calculate the blurring kernel $\hat{k}$, the image blurring situation may be reflected without omission, and the calculated image $\hat{I}$ is more similar to the original scene.

In operation 104, deblurring is performed based on the DVS edge estimation image. The following operation may be performed further within a possible range.

Referring again to FIG. 1, in operation 105, the image deblurring method determines whether a sharpness of the image of the current iteration matches a sharpness of the image of the previous iteration. When the two images are determined to match in terms of sharpness, the image deblurring method determines the image of the current iteration as a deblurring result, and terminates operation. When the two images are not determined to match, operation 106 may be performed.

When there is no change between images acquired after two iterations, it may indicate that a target deblurring value is already satisfied. When there is no change between the images, the image acquired in the current iteration may be output, and the deblurring processing may be terminated. When there is a change between the images, an RGB edge diagram may be calculated and a subsequent iteration may be performed. Whether images acquired after two iterations are the same is determined as follows. When an error in sharpness between the image of the current iteration and the image of the previous iteration is less than a threshold, the images acquired after the two iterations are determined to be the same. Conversely, when the error in sharpness is greater than the threshold, the images acquired after the two iterations are determined to be different.

In operation 106, the image deblurring method determines an average edge diagram based on the image acquired in the current iteration, and returns to operation 103. In a subsequent iteration, the RGB blurred image and the DVS edge estimation image are aligned based on the average edge diagram.

A result of operation 104 is used to generate a directed edge diagram of the RGB image, which is referred to as the average edge diagram herein. An edge diagram with respect to a direction set by the image is acquired based on the image estimated in the current iteration, and the average edge diagram is acquired based on a plurality of edge diagrams. The set direction may be a direction designated at random, or a direction of the camera motion trajectory.

The RGB image and the DVS edge estimation image are aligned based on the average edge diagram. A displacement of alignment is acquired by comparing the average edge diagram to a DVS edge estimation image acquired in the subsequent iteration. By moving and aligning the RGB blurred image and/or the DVS edge estimation image, a degree of precision of RGB and DVS image registration may improve.

When the direction is set to be the direction of the camera motion trajectory, the average edge diagram is generated as follows. The camera motion trajectory during exposure is segmented. An edge diagram with respect to the image acquired in the current iteration in each segment direction is calculated. All acquired edge diagrams are overlaid, and a skeleton diagram is calculated as the average edge diagram.

Figure 7:
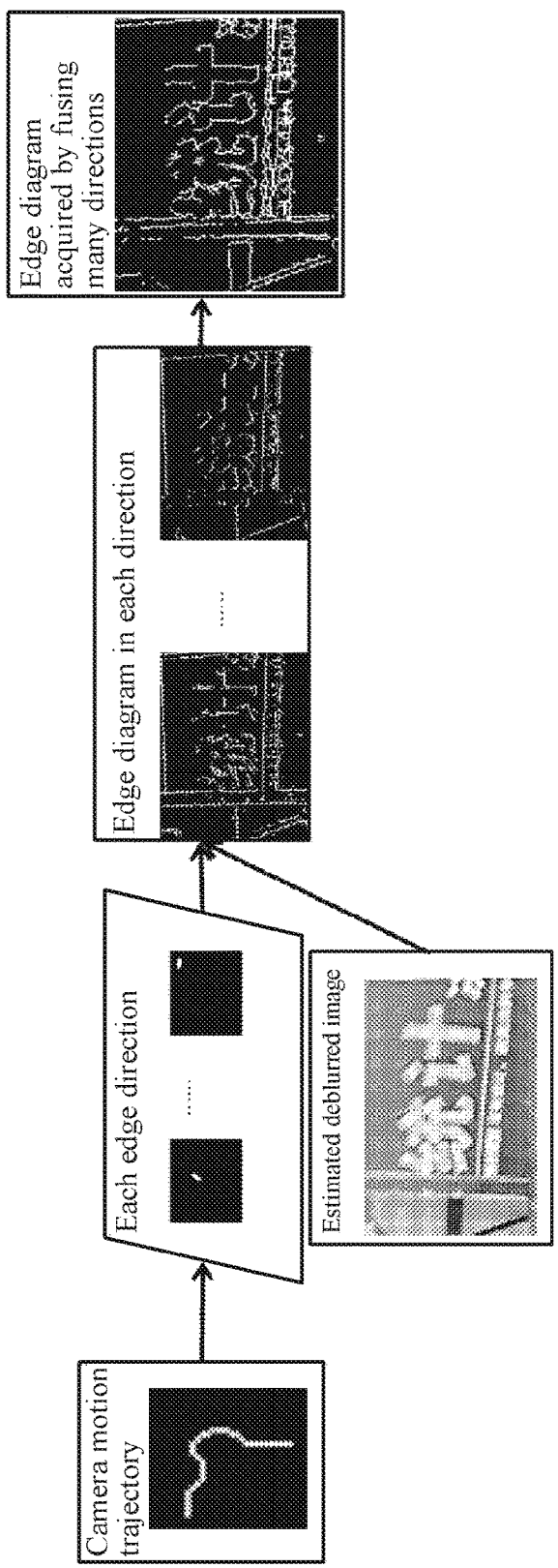
FIG. 7 is a diagram illustrating a process of generating an average edge diagram, according to an example embodiment.

The camera motion trajectory is segmented based on the motion trajectory generated in operation 102. FIG. 7 is a diagram illustrating a process of generating an average edge diagram, according to an example embodiment.

Examples of the image deblurring method are described above. Through the iterations, when the images acquired iteratively, that is, two times, are the same, the iteration is terminated, and a final deblurring result is acquired. More simply, a maximum iteration count is set. The iterations are performed until an iteration count reaches the maximum iteration count. When the iteration count reaches the maximum iteration count, the iteration is terminated, and the final deblurring result is acquired. In another example, a method of comparing the images acquired after the two iterations and a method of setting the maximum iteration count may be used simultaneously. When one of the two conditions is satisfied, the iteration is terminated; otherwise, the iteration is performed. The maximum iteration count may be set based on an actual need and a processing performance of the device.

During deblurring, the camera motion trajectory may be estimated based on the DVS events recorded by the DVS, and an edge of the blurred image may be estimated based on the camera motion trajectory. A DVS edge with respect to a DVS event is estimated, the blurred image or the edge estimation image is aligned to a DVS edge estimation result, and deblurring is performed. Through the above processing, by providing a more realistic motion hypothesis using the camera motion trajectory and the DVS edge estimation image, the deblurring effect may improve.

An image deblurring apparatus is further provided, and the image deblurring apparatus may be used to perform the image deblurring method of FIG. 1.

Figure 8:
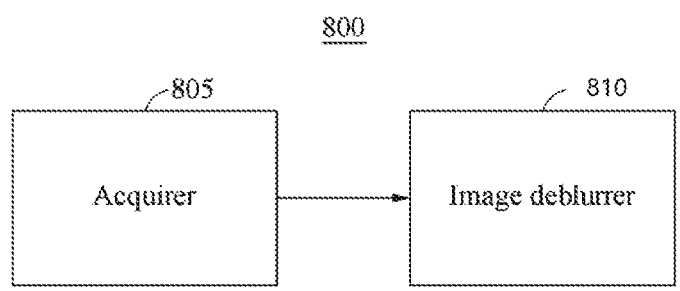
FIG. 8 is a block diagram illustrating a configuration of an image deblurring apparatus according to an example embodiment.

FIG. 8 is a block diagram illustrating a configuration of an image deblurring apparatus 800 according to an example embodiment. As shown in FIG. 8, the image deblurring apparatus 800 includes an acquirer 805 and an image deblurrer 810.

The acquirer 805 acquires a blurred image to be processed and a DVS event set recorded by a DVS while the blurred image is exposed. The image deblurrer 810 deblurs the blurred image based on the DVS event set.

Figure 9:
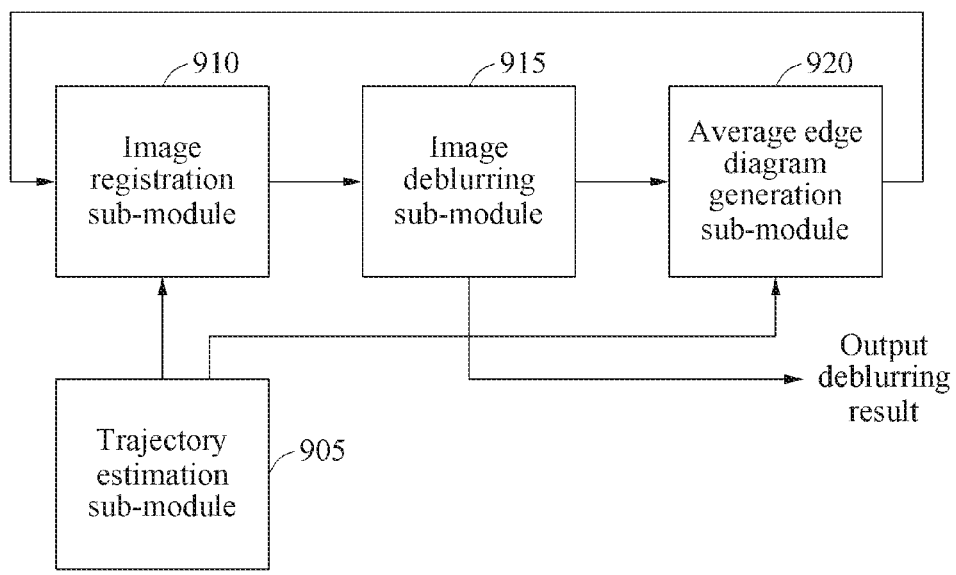
FIG. 9 is a block diagram illustrating a configuration of an image deblurrer of an image deblurring apparatus, according to an example embodiment.

FIG. 9 is a block diagram illustrating a configuration of an image deblurrer of an image deblurring apparatus, according to an example embodiment. As shown in FIG. 9, the image deblurrer 810 includes a trajectory estimation block 905, an image registration block 910, an image deblurring block 915, and an average edge diagram generation block 920.

The trajectory estimation block 905 estimates a camera motion trajectory and a DVS edge estimation image during exposure based on the DVS event set. The trajectory estimation block 905 may perform operations 101 and 102 of FIG. 1.

The image registration block 910 aligns the blurred image and the DVS edge estimation image, and acquires the aligned blurred image and the aligned DVS edge estimation image. The image registration block 910 may perform operation 103 of FIG. 1.

The image deblurring block 915 acquires an image of a previous iteration by deblurring the aligned blurred image using deconvolution transform based on the aligned DVS edge estimation image. When a difference in sharpness between the image of the current iteration and the image of the previous iteration is less than a threshold, the image deblurring block 915 outputs the image of the previous iteration as a deblurring result. Conversely, when the difference in sharpness is greater than the threshold, the image deblurring block 915 transmits the image of the current iteration to the average edge diagram generation block 920. The image deblurring block 915 may perform operations 104 and 105 of FIG. 1.

The average edge diagram generation block 920 determines an average edge diagram based on the image input by the image deblurring block 915. The average edge diagram generation block 920 transmits the average edge diagram to the image registration block 910 such that the average edge diagram is used to align the blurred image and the DVS edge estimation image. The average edge diagram generation block 920 determines the average edge diagram of a direction of the camera motion trajectory. The average edge diagram generation block 920 may perform operation 106 of FIG. 1.

Figure 10A:
FIGS. 10A, 10B, and 10C are diagrams illustrating an input blurred image, a result acquired by an existing image deblurring method, and a result acquired by an image deblurring method according to an example embodiment, respectively.
Figure 10B:
Figure 10C:

FIGS. 10A, 10B, and 10C are diagram illustrating an input blurred image, a result acquired by an existing image deblurring method, and a result acquired by an image deblurring method according to an example embodiment, respectively. A deblurring test was carried out using the image deblurring method suggested herein and an existing deblurring method, and the results were compared. FIGS. 10B and 10C illustrate a result of comparing the effect of the image deblurring method with the effect of the existing technology. As shown in FIGS. 10A through 10C, the deblurring effect may improve further.

According to example embodiments, by estimating a camera motion trajectory, estimating an edge of a blurred image based on the camera motion trajectory, estimating a DVS edge based on DVS events, aligning the blurred image or an edge estimation image of the blurred image to a DVS edge estimation result, and deblurring the blurred image, a deblurring effect may improve.

The above-described example embodiments may be recorded in non-transitory computer-readable media including program instructions to implement various operations that may be performed by a computer. The media may also include, alone or in combination with the program instructions, data files, data structures, and the like. The program instructions recorded on the media may be those specially designed and constructed for the purposes of the example embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The media may be transfer media such as optical lines, metal lines, or waveguides including a carrier wave for transmitting a signal designating the program command and the data construction. Examples of program instructions include both machine code, such as code produced by a compiler, and files containing higher level code that may be executed by the computer using an interpreter. The described hardware devices may be configured to act as one or more software modules to perform the operations of the above-described example embodiments, or vice versa.

The foregoing example embodiments are examples and are not to be construed as limiting. The present teaching can be readily applied to other types of apparatuses. Also, the description of the example embodiments is intended to be illustrative, and not to limit the scope of the claims, and many alternatives, modifications, and variations will be apparent to those skilled in the art.

What is claimed is:

1. An image deblurring method comprising:
    acquiring a blurred image;
    acquiring, by a dynamic vision sensor (DVS), a set of events, while the blurred image is exposed;
    estimating a DVS edge estimation image, based on the set of events; and
    deblurring the blurred image, based on the DVS edge estimation image,
    wherein the DVS edge estimation image is determined by aligning and overlaying images that are formed in all time slices, and calculating a skeleton diagram of the overlaid images as the DVS edge estimation image.

2. The method of claim 1, wherein the estimating comprises:
    dividing an exposure time into N time slices in a temporal order;
    generating an image by integrating DVS events positioned in a same time slice, among the set of events;
    aligning and overlaying images that are generated in the N time slices; and
    determining a skeleton diagram of the overlaid images as the DVS edge estimation image.

3. The method of claim 2, wherein the aligning comprises: determining $$[\Delta x, \Delta y] = \text{argmin} \sum_{x,y} (B(x + \Delta x, y + \Delta y) - A(x, y))^2$$

with respect to images A and B of arbitrary two time slices, (x,y) denoting two-dimensional (2D) coordinates of a pixel point of the image, A(x,y) and B(x,y) denoting a value of a pixel point of the image A and a value of a pixel point of the image B, respectively, $\Delta x$ and $\Delta y$ denoting 2D displacement values that are used to align the image B to the image A, and argmin (·) denoting an independent variable when (·) is at a minimum;
    determining a displacement of either one or both of the image B and the image A, based on the $[\Delta x, \Delta y]$; and
    aligning the image A and the image B, based on the displacement.

4. The method of claim 2, wherein the aligning and overlaying comprises any one or any combination of:
    determining $[\Delta x, \Delta y]$ with respect to images that are generated for every two consecutive time slices, and aligning and overlaying an image of a subsequent time slice to an image of a previous time slice; and
    determining $[\Delta x, \Delta y]$ with respect to images that are generated for every two consecutive time slices, and aligning and overlaying an image of a previous time slice to an image of a subsequent time slice.

5. The method of claim 1, wherein the deblurring of the blurred image, based on the DVS edge estimating image, comprises:
    aligning the blurred image and the DVS edge estimation image; and
    deblurring the blurred image, based on an alignment result of the alignment.

6. The method of claim 5, wherein the deblurring of the blurred image, based on the alignment result, comprises:
    deblurring the aligned blurred image, based on the aligned DVS edge estimation image, using deconvolution transform;
    outputting an image of a current iteration as a deblurring result of the deblurring of the aligned blurred image;
    determining that the deblurring result is equal to a deblurring value in response to a difference in sharpness between an image of the current iteration and an image of a previous iteration being less than a threshold; and
    determining that the deblurring result is less than the deblurring value in response to the difference in sharpness being greater than the threshold.

7. The method of claim 6, further comprising determining a blurring kernel, based on $\hat{k} = \text{arg min} \|\partial \hat{I} * \hat{k} - \partial \hat{C}\|_2 + \lambda_1 \|\hat{k}\|_1 + \lambda_2 \|\partial \hat{I} - \hat{E}\|_2$, $\hat{x}$ denoting a vector form of a matrix x, $\partial$ denoting an operation of a gradient, I denoting an image acquired after deblurring, C denoting the aligned blurred image, E denoting the aligned DVS edge estimation image, $\|vec\|_2$ denoting a 2-norm of a vector, $\|vec\|_1$ denoting a 1-norm of a vector, $\lambda_1$ and $\lambda_2$ denoting two weight values, and argmin (·) denoting an independent variable when (·) is at a minimum.

8. The method of claim 1, wherein the deblurring of the blurred image, based on the DVS edge estimating image, comprises:
    aligning the blurred image and the DVS edge estimation image;
    deblurring the blurred image based on an alignment result of the alignment;
    determining an average edge diagram, based on a deblurring result of the deblurring of the blurred image, based on the alignment result, in response to the deblurring result being less than a deblurring value and a deblurring count of the deblurring of the blurred image, based on the alignment result, being less than a maximum iteration count;

realigning the blurred image and the DVS edge estimation image, based on the average edge diagram, until the deblurring result is equal to the deblurring value or the deblurring count is equal to the maximum iteration count; and outputting the deblurring result.

9. The method of claim 1, wherein the deblurring of the blurred image, based on the DVS edge estimating image, comprises:

aligning the blurred image and the DVS edge estimation image;

deblurring the blurred image, based on an alignment result of the alignment;

determining an average edge diagram, based on a deblurring result of the deblurring of the blurred image, based on the alignment result, in response to a deblurring count of the deblurring of the blurred image, based on the alignment result, being less than a maximum iteration count;

realigning the blurred image and the DVS edge estimation image, based on the average edge diagram, until the deblurring count is equal to the maximum iteration count; and outputting the deblurring result.

10. The method of claim 1, wherein the deblurring of the blurred image, based on the DVS edge estimating image, comprises:

aligning the blurred image and the DVS edge estimation image;

deblurring the blurred image, based on an alignment result of the alignment;

determining an average edge diagram, based on a deblurring result of the deblurring of the blurred image, based on the alignment result, until the deblurring result is less than a deblurring value and a deblurring count of the deblurring of the blurred image, based on the alignment result, is equal to a maximum iteration count;

realigning the blurred image and the DVS edge estimation image, based on the average edge diagram, until the deblurring result is equal to the deblurring value or the deblurring count is equal to the maximum iteration count; and outputting the deblurring result.

11. The method of claim 1, wherein the deblurring comprises:

estimating a camera motion trajectory and the DVS edge estimation image, based on the set of events; and deblurring the blurred image, based on the camera motion trajectory and the DVS edge estimation image.

12. The method of claim 11, wherein the deblurring of the blurred image, based on the camera motion trajectory and the DVS edge estimation image, comprises:

aligning the blurred image and the DVS edge estimation image;

deblurring the blurred image, based on an alignment result of the alignment;

determining an average edge diagram on the camera motion trajectory, based on a deblurring result of the deblurring of the blurred image, based on the alignment result, in response to the deblurring result being less than a deblurring value;

realigning the blurred image and the DVS edge estimation image until the deblurring result is equal to the deblurring value; and outputting the deblurring result.

13. The method of claim 12, wherein the determining of the average edge diagram comprises:

determining edge diagrams in all segment directions on the camera motion trajectory with respect to a sharpness of an image in a current iteration;

overlaying the edge diagrams; and determining, based on the overlaid edge diagrams, a skeleton diagram to be the average edge diagram.

14. The method of claim 11, wherein the deblurring of the blurred image, based on the camera motion trajectory and the DVS edge estimation image, comprises:

aligning the blurred image and the DVS edge estimation image;

deblurring the blurred image, based on an alignment result of the alignment;

determining an average edge diagram on the camera motion trajectory, based on a deblurring count of the deblurring of the blurred image, based on the alignment result, in response to the deblurring count being less than a maximum iteration count;

realigning the blurred image and the DVS edge estimation image, based on the average edge diagram, until the deblurring count is equal to the maximum iteration count; and outputting a deblurring result.

15. The method of claim 11, wherein the deblurring of the blurred image, based on the camera motion trajectory and the DVS edge estimation image, comprises:

aligning the blurred image and the DVS edge estimation image;

deblurring the blurred image based on an alignment result of the alignment;

determining an average edge diagram on the camera motion trajectory, based on a deblurring result of the deblurring of the blurred image, based on the alignment result, in response to the deblurring result being less than a deblurring value and a deblurring count of the deblurring of the blurred image, based on the alignment result, being less than a maximum iteration count;

realigning the deblurred image and the DVS edge estimation image, based on the average edge diagram, until the deblurring result is equal to the deblurring value or the deblurring count is equal to the maximum iteration count; and outputting the deblurring result.

16. The method of claim 11, wherein the estimating of the camera motion trajectory, based on the set of events, comprises:

dividing an exposure time into N time slices in a temporal order, generating an independent image, based on DVS events positioned in a same time slice, among the set of events; and determining the camera motion trajectory during exposure, based on images that are generated in the N time slices.

17. The method of claim 16, wherein the determining of the camera motion trajectory comprises:

determining a camera displacement in two consecutive time slices, based on a positional relationship of the DVS events, in images that are generated for every two consecutive time slices;

connecting camera displacements in a temporal order for every two consecutive time slices during the exposure; and generating the camera motion trajectory during the exposure.

18. An image deblurring apparatus comprising:
a camera configured to acquire a blurred image;
a dynamic vision sensor (DVS) configured to acquire a set of events, while the blurred image is exposed; and
an image deblurrer configured to:
   estimate a DVS edge estimation image, based on the set of events; and
   deblur the blurred image, based on the DVS edge estimation image,
wherein the DVS edge estimation image is determined by aligning and overlaying images that are formed in all time slices, and calculating a skeleton diagram of the overlaid images as the DVS edge estimation image.

* * * * *